United States Patent Office 2,958,574
Patented Nov. 1, 1960

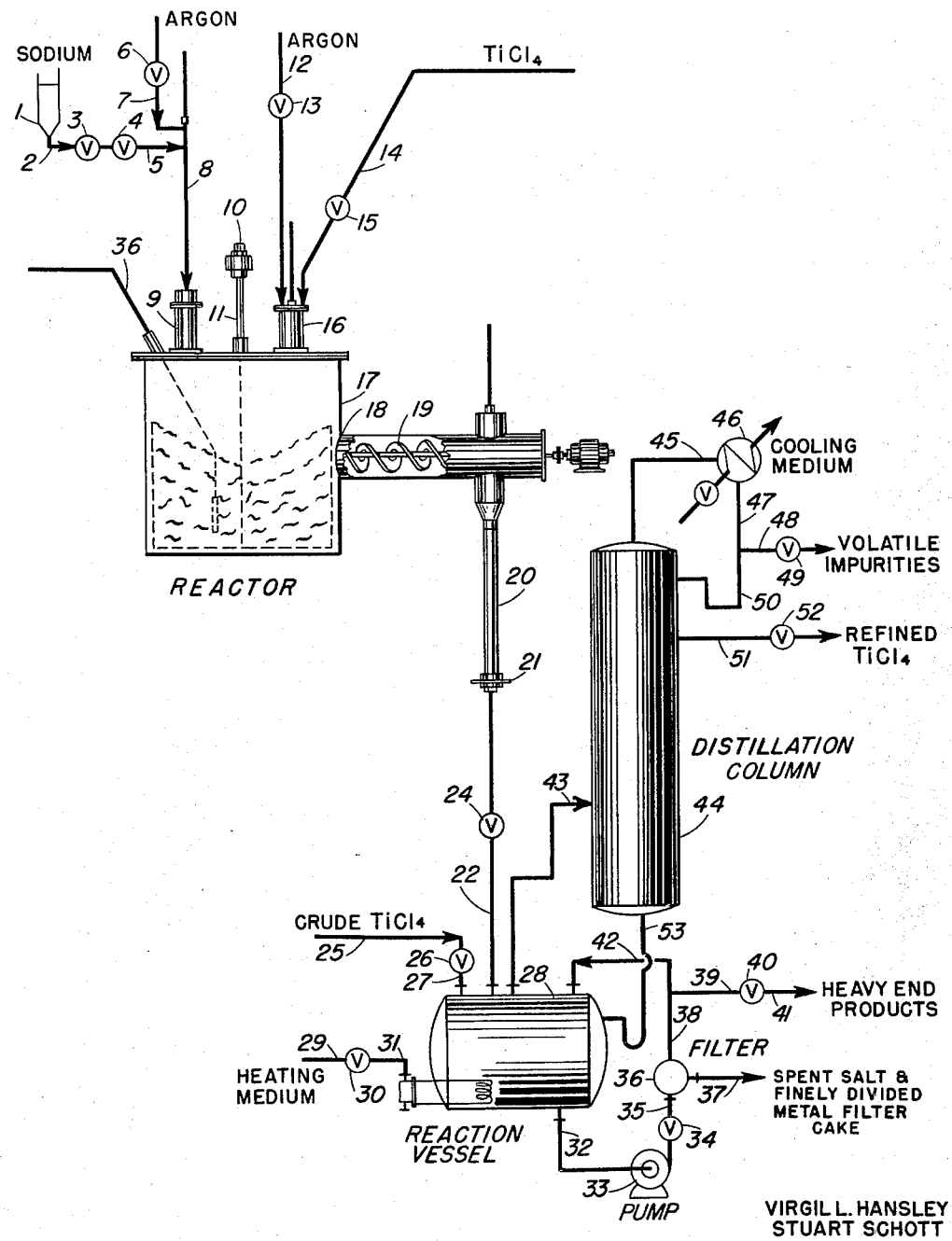

2,958,574

PURIFICATION OF TITANIUM TETRACHLORIDE

Virgil L. Hansley and Stuart Schott, Cincinnati, Ohio, assignors to National Distillers and Chemical Corporation, New York, N.Y., a corporation of Virginia Filed Dec. 2, 1955, Ser. No. 550,677

5 Claims. (Cl. 23—87)

This invention concerns the purification of titanium tetrachloride and more particularly concerns a method for removing undesirable impurities such as vanadium and silicon compounds and undesirable colored and contaminating components, which are not otherwise readily removable.

Titanium tetrachloride is of great and increasing importance, particularly as a raw material for the manufacture of titanium metal, where purity of reactants is exceedingly critical. Approximately four parts by weight of titanium tetrachloride are required to produce one part by weight of titanium metal, and thus the concentration of any impurities present in the titanium tetrachloride is approximately quadrupled in the product titanium metal. The impurities which must be removed are particularly those which contribute to decreased ductility of the product titanium metal, that is, those that increase the hardness. A typical example of such an impurity is vanadium oxychloride ($VOCl_3$) which contributes oxygen to the product titanium.

Decolorization and purification of titanium tetrachloride may be effected by several methods. For example, it is known to reflux titanium tetrachloride with various treating agents such as sulfides, hydrated ferrous sulfate, metals, and the like in conjunction with rectification. It is also possible to purify titanium tetrachloride by rectification but only to a certain degree and for certain impurities. Compounds such as vanadium oxychloride (B.P. 127° C.) boil too close to the titanium tetrachloride (B.P. 136° C.) for the efficient purification required to produce titanium tetrachloride for use in production of titanium metal.

It has now been discovered that it is possible to purify and decolorize titanium tetrachloride by treatment with specially prepared very finely divided metals. Certain powdered metals have been previously tested but have been relatively inefficient as shown by the comparative experimental tests described in greater detail below. It has been found that very finely divided metals as produced by low temperature reaction of alkali metals, and particularly sodium, with oxides and salts such as the sulfates and halides, show excellent purifying and decolorizing action and are surprisingly more efficient than the ordinary metal powders available commercially and produced by other techniques.

According to the present invention, the impure titanium tetrachloride is contacted with the specially prepared finely divided metal and heated at reflux temperature. After sufficient time of treatment, the purified titanium tetrachloride is recovered by volatilization from the finely divided metal, as, for instance, by distillation therefrom. If desired, the heat treatment may be conducted under pressure to achieve higher treating temperatures. In general, the treatment may be effected by liquid phase or vapor phase contact or by a combination of the two. In any case, recovery of purified products is excellent, being at least 95% of the crude titanium tetrachloride treated. The precise temperature and time used in the treatment step will depend on the concentration of impurities in the crude titanium tetrachloride as well as the amount of specially prepared powdered metal employed.

In all cases, the amounts of impurities as measured, for instance, by vanadium and silicon analyses of the titanium tetrachloride purified as herein described, were greatly reduced. This was also true in comparison with purity of titanium tetrachloride purified by treatment with the same quantity of ordinary commercial metal powders.

In the commercial production of titanium tetrachloride, the titanium-containing material is chlorinated to produce a crude chlorination product which may contain iron, chlorine, silicon, phosphorus, vanadium, columbium, and other impurities, either as such, or in combination with other elements.

Some of these impurities can be removed from technical or commercial grades of titanium tetrachloride by a distillation of the crude titanium tetrachloride. Such purification will remove certain impurities in a very efficient and complete manner while others remain relatively unaffected. In any event, it is highly desirable to employ at least one distillation or volatilization step in conjunction with the treatment step. The distillation step can be carried out either in conjunction therewith, or following the metal treatment. It has been found preferable for best purification results to effect the distillation or rectification simultaneously with or directly after the treatment with powdered metals.

The reduction of the metal salts and oxides to form the corresponding metal powders which are especially useful in this invention is carried out at a relatively low temperature and in a solid, finely divided mixture including the powdered metal salt or oxide as the reaction medium. Thus, there is produced a metal powder which is highly reactive, quite pure, and in a very fine state of subdivision. It is further possible to produce these metals in a substantially continuous manner. Although it is possible to produce the finely divided metals in a reaction mixture in which sodium, a finely divided carrier or solid reaction medium, and the metallic compound are comingled, it has been found much more preferable to operate this step to actually produce the solid finely divided material as a product of the reduction reaction itself. For example, if a metal halide is reduced with sodium, the only product is a finely divided, solid mixture of the sodium halide and the metal. In general, the halide used is the cheapest and most readily available, the metal chloride, thus producing a finely divided mixture of sodium chloride and the metal powder. If a metal oxide is used, then the sole product is a finely divided, solid mixture of sodium oxide and the metal. The preferred product mixture for the treatment step comprises sodium chloride and the corresponding metal powder. Operating thusly prevents the introduction of other extraneous materials into the product and the finely divided mixture of salt and highly active powdered metal can be used directly for treatment and purification of the titanium tetrachloride. In fact, the presence of the sodium chloride in limited amounts as it is produced in the reduction reaction may be of value since it serves as an inert solid diluent for the highly reactive metal powder.

Metals which can be employed for the purposes herein described include, copper, zinc, iron, chromium, silver, nickel, titanium, tin, zirconium, as well as mixtures of these metals, and the metallic compounds which can be used for producing the metals include ferric chloride, ferrous chloride, the iron oxides, zinc oxide, zinc chloride, the titanium chlorides, the zirconium chlorides, cuprous chloride, cupric chloride, copper oxide, cuprous iodide, cupric iodide, cuprous bromide, cupric bromide, copper fluoride, silver fluoride, silver chloride, silver iodide, silver bromide, copper acetate, nickel chloride, cobalt chloride, nickel bromide, cobalt bromide, nickel sulfate, cobalt sulfate, aluminum chloride, magnesium chloride, chromium chloride, stannic chloride, stannous chloride, as well as other metal oxides and salts. Even mixtures of the metal oxides, halides, and sulfates can be employed to get mixtures of metal powders.

Any of the alkali metals can be employed as the reducing agent. These include lithium, sodium, potassium, rubidium, and cesium and mixtures of these alkali metals. It is preferred, however, to employ sodium or mixtures containing substantial amounts of sodium, since it is the cheapest and most readily available commercially and the results obtained thereby are entirely satisfactory.

The temperatures which can be employed fall within the range from the melting point of sodium up to the melting point of the reaction mixture, thereby assuring that the reaction medium is a solid finely divided mixture at all times. The preferred temperature range is from about 100° C. up to about 450° C.

The general method for preparation of the finely divided metal powders used in the process of the invention is described hereinafter. One form of equipment suitable for carrying out the process comprises a jacketed reaction vessel which is designed in such a manner that either heating or cooling can be applied and controlled. A suitable stirrer or other agitation device is positioned there in and attached to a power source such that a good tumbling and turbulent type of agitation is obtained. In the upper portion of the reactor, there is provided an inlet for charging the alkali metal, preferably sodium, an inlet for adding the metallic compound reactant, and a gas inlet and gas outlet for maintaining an inert gas blanket within the reactor vessel. These reactants can be charged batchwise, or, preferably, continuously or semi-continuously. Temperature measuring means are also provided, such as a thermometer or a thermocouple. In the lower portion, conveniently in the side of the reactor, there is an outlet fitted with a screw conveyor, worm gear, or other appropriate device for transferring solids, for removing the solid, finely divided product mixture of metal and sodium halide in at least a semi-continuous or intermittent and preferably a continuous manner. The product as removed may be collected into a receiving or storage vessel. Alternately, it can be passed directly into a treatment zone for contacting with the crude titanium tetrachloride. For instance, this mixture of finely divided metal and salt can be charged into a treatment vessel for contacting titanium tetrachloride, the reactants being charged either batchwise or preferably continuously or at least semi-continuously. Removal of purified titanium tetrachloride and spent treating solids can likewise be conducted either in a batchwise or continuous manner.

One example is the sodium reduction of zinc oxide which is typical of the reduction of a metal oxide. About 70 parts of dry zinc oxide is charged into the reactor. A blanket of inert gas is used, such as nitrogen, argon, helium, or other gas inert to reactants and products. About 30 parts of sodium was added. The mixture was stirred in the inert atmosphere and heated to about 230-300° C. At this temperature the reduction proceded rapidly yielding a very finely divided mixture of zinc metal, unreacted zinc oxide, and sodium oxide. If desired, the by-product sodium oxide can be separated by leaching with water.

The procedure for preparation of finely divided nickel for treatment of titanium tetrachloride is similar and is as follows. About 1.5 parts by weight of sodium were added to 20 parts of dried salt at approximately 200° C. which had been previously placed in the reaction vessel purged with nitrogen. Anhydrous nickel chloride powder (32.5 parts) was added to the solid mixture at a temperature of about 250° C. The nickel chloride was reduced to metallic nickel in the solid, finely divided mixture. The color of the mixture changed to a dark gray color. The sodium chloride was removed from the finely divided nickel product by solution in water. The nickel can be used for treatment of titanium tetrachloride as well as the original mixture of nickel powder and sodium chloride.

In a similar method, finely divided copper can be prepared for the treatment process. About six parts by weight of sodium were added to about 200 parts of dried salt at about 275° C. under a nitrogen atmosphere. Anhydrous cupric chloride was added as a powder. The sodium and cupric chloride reacted rapidly to form a dark reddish solid reaction product. Addition of the reactants was repeated intermittently until a total of about 36 parts of sodium and 106 parts of cupric chloride had been reacted. If desired, the sodium chloride can be extracted from the powdered copper with water.

A similar procedure is used for reduction of titanium tetrachloride to finely divide titanium metal, which serves also as an excellent purifying agent for titanium tetrachloride. A charge of approximately 200 parts by weight of dried sodium chloride was placed in a reactor provided with a helium atmosphere throughout the reaction period. The salt was heated to about 240° C. A portion of six parts of sodium was added to the agitated salt reaction medium. About 12.4 parts of titanium tetrachloride was then added slowly. The additions of sodium and titanium tetrachloride were repeated intermittently and alternatively until a total of 36 parts of sodium and about 75 parts of titanium tetrachloride had been added. The resulting mixture of finely divided titanium and sodium chloride was allowed to cool and removed from the reactor. This mixture is used directly for treatment of titanium tetrachloride. If desired, it can be treated with water to dissolve salt before using the finely divided titanium for the treatment.

The same general procedure may be used for preparing a variety of finely divided metals as shown in Table I.

TABLE I

| Compound: | Carrier medium for reaction of the compound with sodium |
|---|---|
| $Fe_2O_3$ | NaCl |
| ZnO | ZnO |
| $Cu_2Cl_2$ | NaCl |
| $NiCl_2$ | NaCl |
| $TiCl_4$ | NaCl |
| Ni oleate | NaCl |
| Ni acetate | NaCl |

The finely divided, more active metals produced by the reaction of the oxides and halides with sodium in a reaction mixture consisting essentially solely of a solid finely divided mixture of the products of the reaction are especially adapted for use in purification of titanium tetrachloride.

*Example 1*

A series of titanium tetrachloride treatment experiments was carried out in which there was a comparison of the purification effects of commercial metal powders and the colloidal metal powders obtained by the low temperature sodium reduction process as herein described.

The treatments were carried out in an all-glass treatment vessel in which about 345 parts of titanium tetrachloride were refluxed and agitated with the metal powder. The titanium tetrachloride was distilled through a dephlegmating column to avoid spray being carried over, and the vapors condensed and run into the receiver, from which samples were withdrawn for analysis. The results are shown in Table II.

TABLE II

| Expt. No. | Treatment | Treatment Time, min. | Impurities remaining in distillate, percent | | Color of Distillate |
|---|---|---|---|---|---|
| | | | V | Si | |
| 1 | None (Control) | 90 | 0.0646 | 0.110 | Yellow. |
| ZINC POWDERS | | | | | |
| 2 | 0.25% Zn dust | 90 | 0.0476 | 0.0136 | Faint yellow. |
| 3 | 0.50% Zn dust | 90 | 0.0253 | 0.0113 | Do. |
| 4 | 0.5% Zn from ZnO by Na. | 90 | <0.0007 | 0.0034 | Colorless. |
| 5 | 0.5% Zn from ZnCl₂ by Na. | 90 | <0.0007 | 0.0102 | Do. |
| COPPER POWDERS | | | | | |
| 6 | 0.1% Commercial Cu. | 90 | 0.051 | 0.123 | Light yellow. |
| 7 | 0.5% Commercial Cu. | 90 | 0.004 | 0.102 | Do. |
| 8 | 0.5% Cu from CuCl by Na. | 90 | <0.0007 | 0.0306 | Colorless. |
| IRON POWDERS | | | | | |
| 9 | 0.5% Fe by H₂ | 90 | 0.0020 | 0.0136 | Light yellow. |
| 10 | 0.5% Fe from FeCl₃ by Na. | 90 | <0.0007 | 0.0034 | Colorless. |
| MISCELLANEOUS | | | | | |
| 11 | 0.5% Ni from NiCl₂ by Na. | 90 | 0.0610 | 0.038 | Light yellow. |
| 12 | 0.6% Ti from TiCl₄ by Na. | 90 | <0.0007 | 0.010 | Colorless. |
| 13 | 0.02% Ti from TiCl₄ by Na. | 90 | 0.0020 | 0.027 | Do. |

As can be seen from data in the foregoing Table II, in which the percent shown for the metal powder employed is based on the weight of the impure titanium tetrachloride, highly effective purification was obtained when the metal powder was used in amounts that were substantially equivalent to, or less than, that theoretically required to reduce the volatile vanadium- and silicon-containing impurities to less volatile substances. For example, based on the vanadium impurity being $VCl_5$ and the silicon impurity being $SiCl_4$, and reduction thereof to $VCl_3$ and Si, respectively, the 0.5% of Zn (Expts. 4 and 5) is slightly less than the 0.59% theoretically required for such reduction of the V and Si content shown for the control Expt. 1; and, the 0.5% Fe in Expt. 10 is substantially the stoichiometric amount of Fe required for such reduction.

Very good results were achieved with the specially prepared metal powders. For example, iron powder treatment of titanium tetrachloride lowered the level of vanadium below normal specification limits and also gave a significant drop in the silicon content. Treatment with iron, zinc, and copper metal powders prepared by this special method has been found to yield clear and colorless titanium tetrachloride. It has been found desirable to distill the titanium tetrachloride directly from the metal powder, and in the presence thereof.

Example 2

A typical large scale reaction procedure is described for preparation of the finely divided metals where the metal halide is liquid.

The equipment and details of the process are shown in the single figure, the operation of which is described below. Referring to the drawing, reactor 17 is provided with agitator 11, consisting of a power source 10, and suitable supports, shaft, and propeller and/or blades adapted to keep the reactor contents in a state of agitation. Provision is made for the continuous or at least semi-continuous introduction into reactor 17, of sodium from tank 1 through lines 2, 5, and 8, through which the flow is controlled by valves 3 and 4, and thence into the reactor by inlet pipe 9. Inert gas (argon) may be introduced into the reactor zone by line 7 controlled by valve 6. Provision is also made for the introduction into reactor 17 of the metal compound to be reduced via line 14, controlled by valve 15, and thence into the reactor by inlet pipe 16.

Inert gas (argon) may additionally or alternatively be introduced via line 12 controlled by valve 13. The temperature is measured and controlled by means of thermocouple 36. Suitable heating and/or cooling means are employed in conjunction with reactor 17.

A typical example for preparing titanium metal powder is described below. A titanium and by-product salt mixture having a composition of Ti:4NaCl from 2090 parts of sodium and 4380 parts of titanium tetrachloride is prepared by charging the aforesaid reactants preferably in a continuous manner into stirred reactor 17 maintained under an argon blanket and containing 100 parts of dried sodium chloride as a heel. The reaction temperature is about 250–300° C.

The finely divided solid mixture which consists substantially of sodium chloride and titanium is discharged via outlet 18 from reactor 17 through pipe 19 which is suitably equipped with a screw device or other conveyor system for transferring finely divided solids. The solids in line 18 are discharged into line 20, in which flow is controlled by slide valve 21, and thence through line 22 controlled by valve 24.

After the original heel of pure sodium chloride has been replaced in the reactor 17 the reaction product coming through line 22 analyzed 17% titanium metal and 83% sodium chloride or the ratio of Ti:4NaCl.

About 500 parts of this finely divided reaction product (Ti:4NaCl) are passed via line 22 into treating vessel 28. Via lines 25 and 27 controlled by valve 26, 83,000 parts of crude titanium tetrachloride are added to vessel 28. This titanium tetrachloride analyzed 0.0646 percent vanadium and 0.110 percent silicon and had a light yellow color. A suitable heating medium was introduced via line 29 and 31 controlled by valve 30 into a heating coil in vessel 28 to maintain and control the temperature at or in the vicinity of the reflux temperature of $TiCl_4$ (136.5° C.). Other heating means can be used. Contact of the crude liquid $TiCl_4$ and finely divided metal should be ½ to 2 hours. After this initial contact period the heat supplied to vessel 28 is increased so that vapors pass up into distillation column 44 via line 43. During the distillation the heavy sludge which is formed as a lower layer in vessel 28 may be removed at least intermittently by bottom line 32 and pumped by pump 33 through line 35 controlled by valve 34 and thence into filter 36. A filter cake consisting essentially of spent salt and finely divided titanium metal is removed from filter 36 by line 37. A stream consisting essentially of titanium tetrachloride and small amounts of heavy ends is removed via line 38, at least a part of which is purged through lines 39 and 41, controlled by valve 40. This purge stream may be fed to a distillation process to recover titanium tetrachloride. A part may be recycled to vessel 28 by line 42, if desired. Purified titanium tetrachloride is removed preferably as vapor by line 43. It can be introduced either as a vapor or liquid into distillation column 44 with reflux returning to vessel 28 through line 53. There is removed as an overhead stream from column 44, via line 45, a stream of volatile impurities. This stream is passed to condenser 46 and a condensed stream removed via line 47. A part can be purged by line 48 controlled by valve 49, and at least a part returned as reflux to column 44 via line 50. Refined $TiCl_4$ is removed as a side stream from column 44 through line 51, controlled by valve 52. This distilled and purified titanium tetrachloride analyzed 0.002% vanadium and 0.027% silicon and amounted to 80,000 parts. It is a clear and colorless liquid.

What is claimed is:

1. Process for purifying impure titanium tetrachloride containing a small amount of impurities, including halogen-containing compounds of vanadium, that boil substantially close to the boiling point of titanium tetrachloride whereby said impurities are difficult to remove therefrom by distillation which comprises heating said impure titanium tetrachloride at reflux temperature in contact with a finely divided solid mass consisting essentially of (1) a metal in elemental state and (2) an inert alkali metal compound, said mass being characterized by (a) having been prepared by reducing a compound of said elemental metal with an alkali metal in a reaction mixture containing said alkali metal at a temperature in the range of the boiling point of the alkali metal up to the melting point of said reaction mixture, (b) said finely divided mass being employed for contact with said impure titanium tetrachloride in an amount such that the content of said metal in elemental state in said finely divided mass does not exceed the substantially stoichiometrically equivalent amount for reduction of said impurities in the titanium tetrachloride to substantially less volatile compounds, and distilling the purified titanium tetrachloride from the mixture resulting from said contact of the impure titanium tetrachloride with said finely divided solid mass.

2. A process, as defined in claim 1, wherein the finely divided solid mass consists essentially of a metal in elemental state and a sodium halide and the impure titanium tetrachloride is maintained in contact therewith at reflux temperature for a period of at least one-half hour.

3. A process, as defined in claim 1, wherein the finely divided solid mass consists essentially of titanium and sodium chloride.

4. A process, as defined in claim 1, wherein the finely divided solid mixture is prepared by sodium reduction of a metal compound from the group consisting of metal salts and metal oxides.

5. A process, as defined in claim 1, wherein the elemental metal is a member from the group consisting of zinc, nickel, copper, titanium and iron.

References Cited in the file of this patent

UNITED STATES PATENTS

| | | |
|---|---|---|
| 2,148,345 | Freudenberg | Feb. 21, 1939 |
| 2,344,319 | Meister | Mar. 14, 1944 |
| 2,416,191 | Meister | Feb. 18, 1947 |
| 2,560,424 | Espenschied | July 10, 1951 |
| 2,754,255 | Stambaugh | July 10, 1956 |
| 2,827,371 | Quin | Mar. 18, 1958 |
| 2,830,888 | Wade | Apr. 15, 1958 |

FOREIGN PATENTS

| | | |
|---|---|---|
| 674,315 | Great Britain | June 18, 1952 |